(12) United States Patent
Schleicher

(10) Patent No.: US 8,682,784 B2
(45) Date of Patent: Mar. 25, 2014

(54) METHOD AND SYSTEM TO PROCESS CREDIT CARD PAYMENT TRANSACTIONS INITIATED BY A MERCHANT

(75) Inventor: Joerg Schleicher, San Francisco, CA (US)

(73) Assignee: eBay, Inc., San Jose, CA (US)

( * ) Notice: Subject to any disclaimer, the term of this patent is extended or adjusted under 35 U.S.C. 154(b) by 821 days.

(21) Appl. No.: 10/941,510

(22) Filed: Sep. 14, 2004

(65) Prior Publication Data

US 2006/0036541 A1    Feb. 16, 2006

Related U.S. Application Data

(63) Continuation of application No. PCT/US2004/022742, filed on Jul. 16, 2004.

(51) Int. Cl.
| | |
|---|---|
| G06Q 40/00 | (2012.01) |
| G06G 1/12 | (2006.01) |
| G06Q 20/00 | (2012.01) |
| G07B 17/00 | (2006.01) |
| G07F 19/00 | (2006.01) |

(52) U.S. Cl.
USPC .................................. 705/39; 705/21; 705/30

(58) Field of Classification Search
USPC ....................................................... 705/22, 26
See application file for complete search history.

(56) References Cited

U.S. PATENT DOCUMENTS

| | | | |
|---|---|---|---|
| 5,426,281 A * | 6/1995 | Abecassis ..................... 235/379 |
| 5,649,118 A | 7/1997 | Carlisle et al. |
| 5,699,528 A * | 12/1997 | Hogan ............................. 705/40 |
| 5,778,178 A | 7/1998 | Arunachalam |
| 5,826,241 A * | 10/1998 | Stein et al. ....................... 705/26 |
| 5,883,810 A | 3/1999 | Franklin et al. |
| 5,903,830 A | 5/1999 | Joao et al. |
| 5,903,878 A | 5/1999 | Talati et al. |

(Continued)

FOREIGN PATENT DOCUMENTS

| | | |
|---|---|---|
| WO | WO-0118720 A1 | 3/2001 |
| WO | WO-2004079603 A1 | 9/2004 |
| WO | WO-2006019368 A2 | 2/2006 |
| WO | WO-2006019368 A3 | 2/2006 |

OTHER PUBLICATIONS

U.S. Appl. No. 10/873,704 Non Final Office Action Mailed Sep. 16, 2009, 14 pgs.

(Continued)

*Primary Examiner* — Asfand Sheikh
(74) *Attorney, Agent, or Firm* — Schwegman, Lundberg & Woessner, P.A.

(57) ABSTRACT

A system, to process credit card payment transactions initiated by a merchant, includes an interface to receive a merchant-initiated request for a transfer of funds from a buyer credit card account. A credit card processing application initiates the transfer of funds from the buyer credit card account to a third-party merchant bank account, held by a third-party payment service. The third-party merchant bank account receives funds from the buyer credit card account on behalf of the merchant. A funds allocation application allocates the received funds to a receiving account of the merchant, the receiving account being maintained by the third-party payment service. The credit card processing application may be virtual point of sale (POS) terminal application, hosted at a server computer system operated by the third-party payment service, and accordingly may be accessible by the merchant via a network.

24 Claims, 11 Drawing Sheets

(56) References Cited

U.S. PATENT DOCUMENTS

| | | | |
|---|---|---|---|
| 5,987,500 A | 11/1999 | Arunachalam | |
| 6,047,268 A | 4/2000 | Bartoli et al. | |
| 6,167,385 A * | 12/2000 | Hartley-Urquhart | 705/35 |
| 6,212,556 B1 | 4/2001 | Arunachalam | |
| 6,473,740 B2 | 10/2002 | Cockrill et al. | |
| 6,901,387 B2 | 5/2005 | Wells et al. | |
| 6,934,692 B1 * | 8/2005 | Duncan | 705/35 |
| 6,996,542 B1 | 2/2006 | Landry | |
| 7,013,001 B1 * | 3/2006 | Felger | 379/115.02 |
| 7,051,001 B1 * | 5/2006 | Slater | 705/39 |
| 7,240,031 B1 * | 7/2007 | Kight et al. | 705/40 |
| 7,353,203 B1 * | 4/2008 | Kriplani et al. | 705/39 |
| 7,537,153 B2 | 5/2009 | Hurwitz et al. | |
| 7,627,526 B2 | 12/2009 | Williams et al. | |
| 7,660,766 B1 | 2/2010 | Lawson et al. | |
| 7,742,994 B1 | 6/2010 | Gupta | |
| 8,352,364 B2 | 1/2013 | Reardon | |
| 2003/0216996 A1 * | 11/2003 | Cummings et al. | 705/39 |
| 2005/0075979 A1 | 4/2005 | Leavitt et al. | |
| 2005/0177510 A1 * | 8/2005 | Hilt et al. | 705/40 |
| 2006/0065717 A1 | 3/2006 | Hurwitz et al. | |
| 2008/0040274 A1 | 2/2008 | Uzo | |
| 2012/0215697 A1 | 8/2012 | Olliphant et al. | |

OTHER PUBLICATIONS

U.S. Appl. No. 10/873,704, Non Final Office Action mailed Mar. 23, 2009, 12 pgs.

U.S. Appl. No. 10/873,704, Non-Final Office Action mailed Jan. 15, 2008, 3 pgs.

U.S. Appl. No. 10/873,704, Non-Final Office Action mailed Sep. 17, 2008, 15 pgs.

U.S. Appl. No. 10/873,704, Response filed May 5, 2008 to Non-Final Office Action mailed Jan. 15, 2008, 22 pgs.

U.S. Appl. No. 10/873,704, Response filed Jun. 18, 2009 to Non Final Office Action mailed Mar. 23, 2009, 23 pgs.

U.S. Appl. No. 10/873,704, Response filed Dec. 17, 2008 to Non-Final Office Action mailed Sep. 17, 2008, 18 pgs.

U.S. Appl. No. 11/873,704, Non-Final Office Action mailed Mar. 23, 2009, 14 pgs.

U.S. Appl. No. 11/873,704, Response filed Jun. 18, 2009 to Non Final Office Action mailed Mar. 23, 2009, 23 pgs.

U.S. Appl. No. 10/873,704, Final Office Action mailed Apr. 15, 2010, 17 pgs.

U.S. Appl. No. 10/873,704, Response filed Dec. 16, 2009 to Non Final Office Action mailed Sep. 16, 2009, 22 pgs.

"U.S. Appl. No. 10/873,704, Advisory Action mailed Aug. 29, 2011", 2 pgs.

"U.S. Appl. No. 10/873,704, Appeal Brief filed Oct. 31, 2011", 36 pgs.

"U.S. Appl. No. 10/873,704, Decision on Pre-Appeal Brief Request mailed Oct. 17, 2011", 2 pgs.

"U.S. Appl. No. 10/873,704, Final Office Action mailed Jun. 9, 2011", 16 pgs.

"U.S. Appl. No. 10/873,704, Non Final Office Action mailed Jan. 5, 2011", 14 pgs.

"U.S. Appl. No. 10/873,704, Non-Final Office Action mailed Aug. 4, 2010", 7 pgs.

"U.S. Appl. No. 10/873,704, Notice of Allowance mailed Jan. 9, 2012", 8 pgs.

"U.S. Appl. No. 10/873,704, Pre-Appeal Brief Request mailed Sep. 9, 2011", 6 pgs.

"U.S. Appl. No. 10/873,704, Response filed Mar. 31, 2011 to Non-Final Office Action mailed Jan. 5, 2011", 23 pgs.

"U.S. Appl. No. 10/873,704, Response filed Jul. 15, 2010 to Final Office Action mailed Apr. 15, 2010", 22 pgs.

"U.S. Appl. No. 10/873,704, Response filed Jul. 27, 2011 to Final Office Action mailed Jun. 9, 2011", 23 pgs.

"U.S. Appl. No. 10/873,704, Response filed Oct. 28, 2010 to Non Final Office Action mailed Aug. 4, 2010", 17 pgs.

"U.S. Appl. No. 13/458,855, Non Final Office Action mailed Jul. 30, 2013", 12 pgs.

"International Application Serial No. PCT/US2004/022742, International Preliminary Report on Patentability mailed Oct. 25, 2007", 5 pgs.

"International Application Serial No. PCT/US2004/022742, International Search Report mailed Sep. 21, 2007", 2 pgs.

"International Application Serial No. PCT/US2004/022742, Written Opinion mailed Sep. 21, 2007", 3 pgs.

"U.S. Appl. No. 13/458,855, Response filed Dec. 2, 2013 to Non Final Office Action mailed Jul. 30, 2013", 14 pgs.

* cited by examiner

150 ──▶

Virtual Terminal - Order Entry Form.

152 ──▶ Customer Information
154
Email Address: [        ]
156 ──▶ Phone Number: [  ] [  ] [  ]

Order Details
Order Type: [- Please Select Type -▼]
Note: (optional) [                    ]
Item Total: $[    ]
Shipping: $[0.00]  ☐ Apply tax to shipping
Tax Percentage: [0.00] %
Tax Amount: $ 0.00
158 ──▶ Order Total: $ 0.00  USD Credit Card Information - Please enter the following information exactly as it appears on the customer's credit card statement.

First Name: [        ]
Last Name: [        ]
Card Type: [    ▼]
Credit Card Number: [        ]
Expiration Date: [01▼] [2003▼]
Card Verification Number (CVN): [   ]  Locate the CVN
Address 1: [        ]
Address 2: (optional) [        ]
City: [        ]
State: [  ▼]
Zip Code: [      ] (5 or 9 digits)     ── 160
Country: United States 164 ──▶ ☐ The customer has been made aware that the payment will be processed by [ABC] and that this charge will appear on their credit card statement as [ABC] "JGOULDTESTO."
── 162

☑ Send a confirmation email to the customer once the transaction has been completed.

[Review Transaction] [Cancel]

FIGURE 8

⚠ We are sorry but the transaction cannot be processed.

Virtual Terminal - Transaction Failed

Customer Information

Email Address: johndoe@hotmail.com
Phone Number: (408) 555-1212

Order Details

Order Type: Goods
Note: Cool Gadgets
Item Total: $100.00
Shipping: $10.00 USD
Tax Amount: $5.22 USD
Order Total: $115.22 USD

Credit Card Information

First Name: John
Last Name: Doe
Card Type: Visa
Credit Card Number: XXXX-XXXX-XXXX-7645
Address 1: 9 Elm St
Address 2: Apt 5
City: Mountain View
State: CA
Zip Code: 94040
Country: United States

[Print this Page] [Start a New Transaction]

FIGURE 9

Virtual Terminal – Transaction Success

The transaction has been successfully processed. Please give the customer the Receipt ID in case they need to make an inquiry about this transaction.

Receipt ID:  3954-5561-1615-1474

Customer Information

Email Address: johndoe@hotmail.com
    Phone Number: (408) 555-1212

Order Details:

Order Type: Goods
    Note: Cool Gadgets
    Item Total: $100.00 USD
    Shipping: $10.00 USD
    Tax Amount: $5.22 USD
    Order Total: $115.22 USD

Credit Card Information

First Name: John
    Last Name: Doe
    Card Type: Visa
    Credit Card Number: XXXX-XXXX-XXXX-7645
    Address 1: 9 Elm St
    Address 2: Apt 5
    City: Mountain View
    State: CA
    Zip Code: 94040
    Country: United States The customer has been made aware that the payment will be processed by [ABC] and that this charge will appear on their credit card statement as "[ABC] *JGOULDTEST0."

[Print this Page]  [Start a New Transaction]

METHOD AND SYSTEM TO PROCESS CREDIT CARD PAYMENT TRANSACTIONS INITIATED BY A MERCHANT

CLAIM OF PRIORITY

This application is a continuation of PCT Application PCT/US04/22742 filed Jul. 16, 2004, which is incorporated herein by reference.

FIELD OF THE INVENTION

An embodiment relates generally to the field of funds transfer automation, and more specifically, to a method and system to process credit card payment transactions initiated by merchant.

BACKGROUND OF THE INVENTION

Credit cards (and debit cards that leverage credit card processing networks) are a widely used financial instrument. Accordingly, in order to appeal to a broad base of potential buyers, it is advantageous for merchants to be able to receive payment for goods or services utilizing a buyer's credit card. In order to receive credit card payments, merchants are typically required to establish so-called merchant bank accounts with acquiring banks, into which a credit card fund transfer can credit funds received in payment of goods or services. The establishment of a merchant bank account is not a trivial undertaking. Approval of a merchant bank account from an acquiring bank may take weeks to receive. Further, there are numerous charges associated with the maintenance and utilization of such merchant bank accounts. For example, an acquiring financial institution (e.g., a bank), with which the merchant bank account is established, typically charges discount rates (e.g., 2%-3% of a transaction total) to settle transactions. There are further reserve costs that the acquiring financial institution may hold back to cover contested charges and charge back fees.

Credit card payments to a merchant bank account may furthermore be merchant-initiated, as is the typical case in a "bricks-and-mortar" purchase scenario, or may be buyer-initiated where the transaction occurs in an online environment. A brief discussion is provided below regarding the processing of credit card transactions that are both merchant-initiated and buyer-initiated, within different environmental contexts.

FIG. 1 is a diagrammatic representation of a prior art credit card transaction processing scheme in the traditional "bricks-and-mortar" environment, where a buyer 10 is physically present at a seller location 12, and accordingly able to present a credit card to the seller 14. In this scenario, in order to communicate the buyer's credit card information to a credit card processing system, the seller 14 typically maintains an on-site Point Of Sale (POS) terminal 16. The seller 14 swipes the buyer's credit card through the POS terminal 16, which then provides the relevant credit card information via a dialup connection, established over a Plain Old Telephone Service (POTS) network 18, to a payment gateway 20. The payment gateway 20 acts as interface between external networks (e.g., the POTS network 18 or the Internet) and a proprietary and secure network over which the various components of a credit card processing system may communicate.

The funds transfer request that is issued from the POS terminal 16, in addition to including the credit card information of the buyer, also includes (1) a merchant identification number, identifying the seller's-merchant bank account at an acquiring financial institution, and (2) a terminal identification number identifying the specific POS terminal 16. The terminal identification number is utilized to distinguish between multiple POS terminals 16 that may be operated by the seller 14, for example at various locations.

From the payment gateway 20, the funds transfer request is communicated to an authorization system 22 for the authorization phase. The authorization system 22 communicates pertinent details of the funds transfer request to an issuing bank 24, at which the buyer's credit card account 26 is maintained. The issuing bank 24 will then make a determination as to whether the buyer's credit card is valid and whether the buyer's credit card has the capacity to absorb the relevant charge. The authorization system 22 may also, in certain circumstances, communicate pertinent details of the funds transferred to an authorization agent 28 (e.g. VISA, MASTERCARD, AMERICAN EXPRESS, etc.), which is distinct at the issuing bank 24, to determine whether the relevant credit card has been reported stolen or the authorization agent is aware of any other deficiencies. Having received affirmative authorizations from the issuing bank 24 and/or the authorization agent 28, the authorization system 22 will, via the payment gateway 20 and the POTS network 18, communicate the authorization back to the POS terminal 16, this authorization then being displayed to the seller. Responsive to the authorization, the POS terminal 16 will also typically print a receipt for signature by the buyer 10.

Having now completed the authorization phase of a payment processing operation, a settlement phase is then initiated. Specifically, the funds transfer request, and the relevant authorization, are communicated to a settlement system 30. The settlement system 30 operates to transfer authorized funds for a transaction from the buyer's credit card account 26 to the seller's merchant bank account 34. A settlement may be performed in real-time, but is more typically performed as part of a batch operation once a day. The settlement process requires the settlement system 30 to communicate details of the funds transfer, including the amount, and merchant identification information to both the issuing bank and the acquiring bank. At the issuing bank 24, the buyer's credit card account 26 is debited with the relevant charge, and a record created in the buyer's credit card account indicating, inter alia, so-called "merchant of record" information, this information identifying the seller. At an acquiring bank 32, the seller's merchant bank account 34 is credited with the relevant amount. The seller's merchant bank account 34 is identified utilizing the merchant identifier number communicated from the POS terminal 16. At the acquiring bank 32, the relevant funds may then be transferred from the seller's merchant bank account 34 to a seller's check account 36.

It will be noted that the seller's merchant bank account 34 is indicated in FIG. 1 as being "present" merchant bank account, indicating that the merchant bank account 34 is associated with a physical POS terminal. Acquiring banks 32 may differentiate between a "present" merchant bank account, which receives payments where the buyer is "present" at a seller location and accordingly able to physically present a credit card, and a so-called "not-present" merchant bank account, for which the credit card information of the buyer is not received by the physical presentation of a credit card to the seller. The reason for the differentiation between "present" and "not-present" merchant bank accounts is that the likelihood of fraud against "not-present" merchant bank accounts is higher, and accordingly the charges levied by the acquiring bank 32 for a "not-present" merchant bank accounts are typically higher than those levied for "present" merchant bank accounts.

Continuing with merchant-initiated credit card payment transactions, FIG. 2 illustrates a credit card processing system to enable merchant-initiated credit card payment transactions when the buyer 10 is "not-present" at a seller location, and accordingly unable to physically present a credit card to the seller 14 to swipe through a POS terminal 16. FIG. 2 illustrates that the buyer communicates order and credit card information 40 to the seller 14 verbally during a telephone call established between the buyer 10 and the seller 14. Of course, the order and credit card information 40 can be communicated utilizing any one of a number of other mediums (e.g., fax, mail, email, web, phone etc.) to the seller 14. In any event, the seller 14 receives the buyer's 10 credit card information without being physically presented the credit card, and accordingly is unable to verify the signature on the credit card against the buyer's 10 signature. In this case, as the seller 14 does not have the physical card, an alternative mechanism is required in order to enable the merchant to initiate a credit card payment transaction, utilizing the received credit card information.

Accordingly, a seller computer system 42, to which the seller 14 has access, is shown to host and execute a virtual POS terminal application 44, into which the seller 14 can input the buyer's 10 credit card information. The seller computer system 42 is coupled by a network 46 (e.g., the Internet) to a virtual POS terminal service provider 48, which in turn processes and forwards the credit card information to a payment gateway 20. From the payment gateway 20, payment processing (i.e., the authorization and settlement phases) is substantially similar to that described above with reference to FIG. 1. One difference will be that the seller merchant bank account 34, maintained by the acquiring bank 32, would be flagged as a "not-present" merchant bank account in this scenario.

FIG. 3 illustrates a typical prior art credit card processing system that enables such buyer-initiated payment transactions (as opposed to the merchant-initiated transactions described above). In FIG. 3, the seller 14 operates a seller website (or marketplace) 50 that hosts a payment application 52 accessible, via a network 54 (e.g., the Internet) by a browser 56 executing on a client machine 58. The seller website 50 may provide a catalogue of items for user purchase, and the payment application 52 may provide a "check out" process to complete payment for items selected for purchase by a buyer 10. Accordingly, the payment application 52 may solicit credit card, and other personal information, from the buyer 10, via the browser 56, and communicate this information, again via the network 54, to the payment gateway 20. In certain applications, the payment application 52 may be hosted on a server external to the seller website 50, in which case the browser 56 may be redirected to a website of a payment service, which itself hosts the payment application 52, in order to process payment for purchases made via the seller website 50.

Once the payment gateway 20 receives the buyer's 10 credit card information, the downstream processing of the transaction is substantially similar to that described above with reference to FIG. 1. Again, it will be noted that, for this scenario, the seller merchant bank account 34 is designated as a "not-present" merchant bank account.

SUMMARY OF THE INVENTION

A method to process credit card payment transactions, initiated by a merchant, includes receiving a merchant-initiated request for a transfer of funds from a buyer credit card account. The transfer of funds from the buyer credit card account to a third-party merchant bank account is initiated, the third-party merchant bank account being held by a third-party payment service. The third-party merchant bank account is to receive funds from the buyer credit card account on behalf of the merchant. The received funds are allocated to a receiving account of the merchant, the receiving account being maintained by the third-party payment service.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 8 is a user interface diagram, illustrating an order entry user interface, according to an exemplary embodiment of the present invention, that may be utilized by a seller to provide credit card and other personal information to a virtual POS terminal application hosted by a third-party payment service.

FIG. 9 is a user interface diagram illustrating an exemplary transaction failed user interface that may be communicated to a user, in one embodiment of the present invention, by a virtual POS responsive to a declining of a credit card payment transaction.

FIG. 10 is a user interface diagram illustrating an exemplary transaction success user interface that may, in one embodiment of the present invention, be presented to a seller user by a virtual POS terminal application hosted by a third-party payment service.

DETAILED DESCRIPTION

A method and system to process credit card payment transactions, initiated by a merchant, are described. In the following description, for purposes of explanation, numerous specific details are set forth in order to provide a thorough understanding of the present invention. It will be evident, however, to one skilled in the art that the present invention may be practiced without these specific details.

Figure 1:
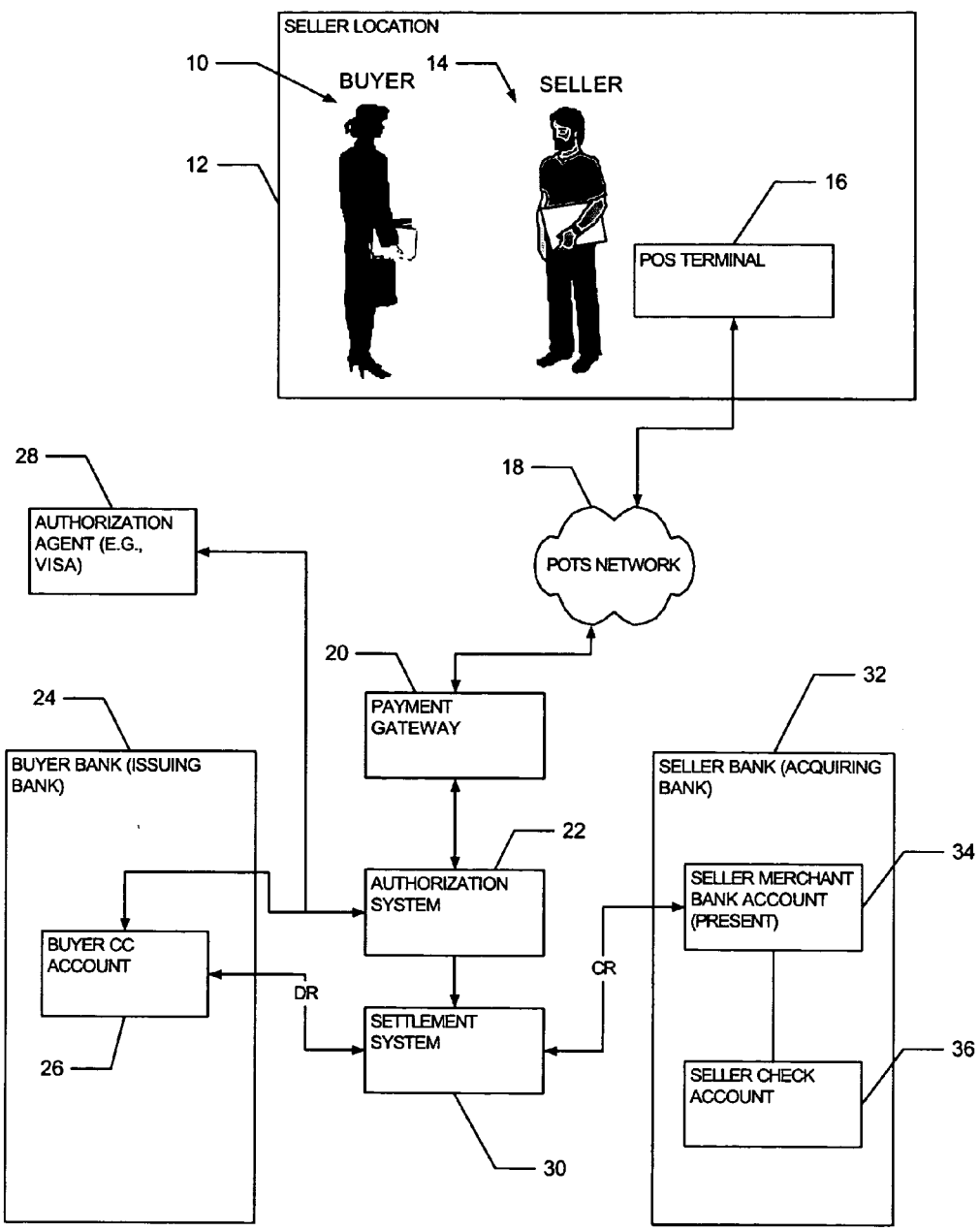
FIG. 1 is a diagrammatic representation of a prior art credit card transaction processing system that includes a physical POS terminal at a seller location to enable merchant-initiated credit card payment transactions.
Figure 2:
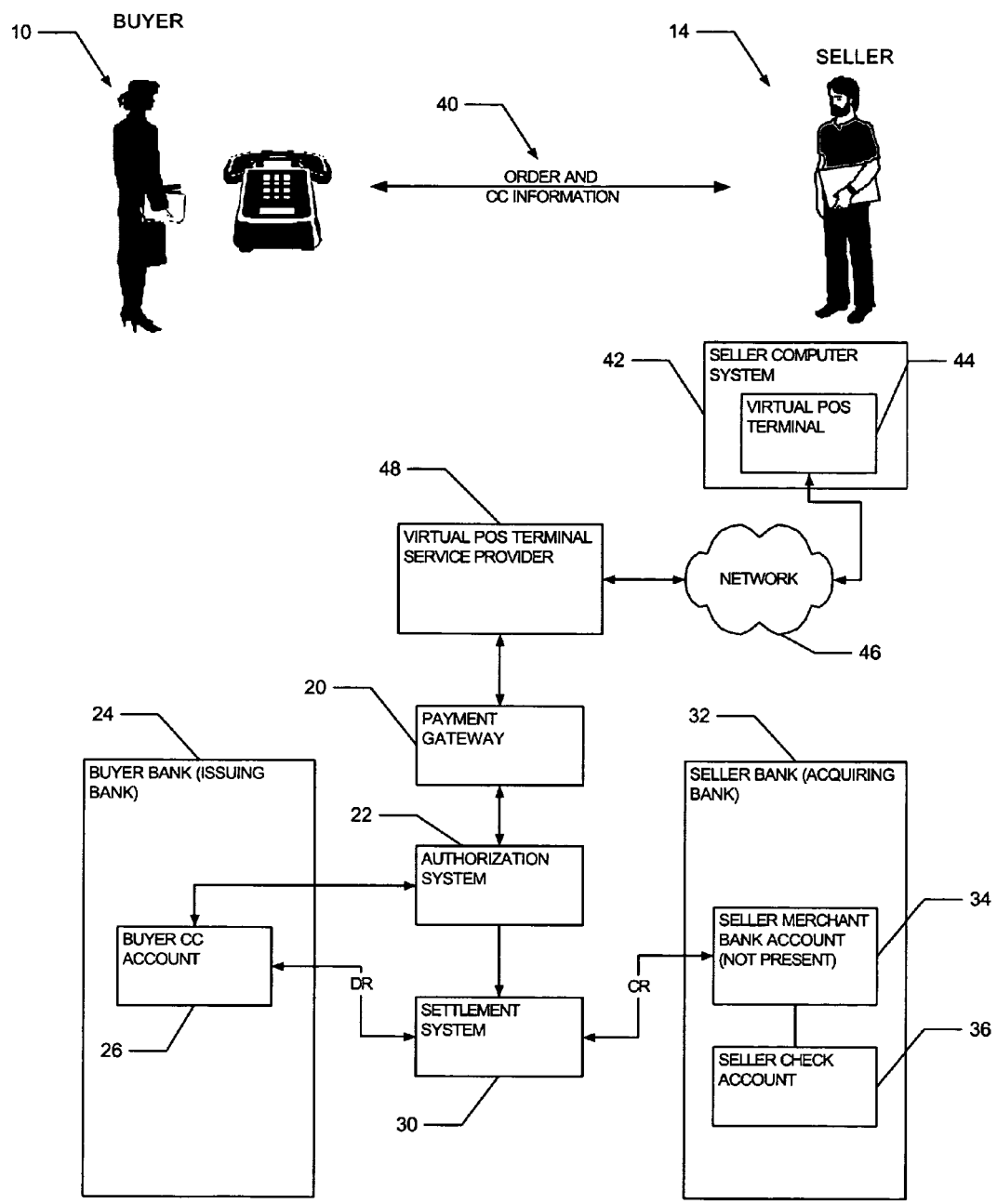
FIG. 2 is a diagrammatic representation of a prior art credit card transaction processing system that includes a virtual POS terminal, hosted on a seller computer system, so as to enable merchant-initiated credit card payment transactions.
Figure 3:
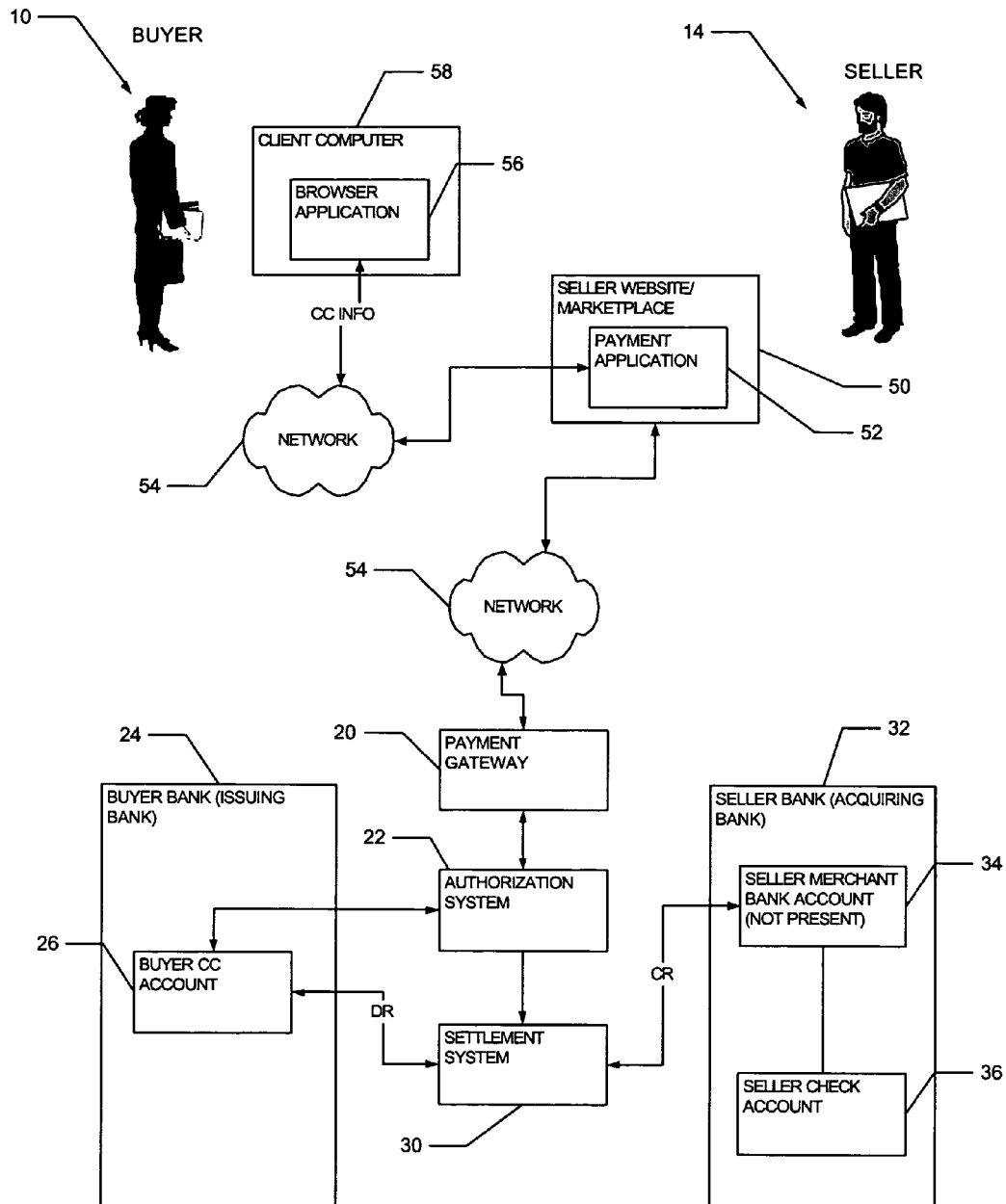
FIG. 3 is a diagrammatic representation of a prior art credit card transaction processing system that enables buyer-initiated credit card transaction processing by providing a buyer with access to a payment application utilizing which the buyer can initiate a payment to a seller.
Figure 4:
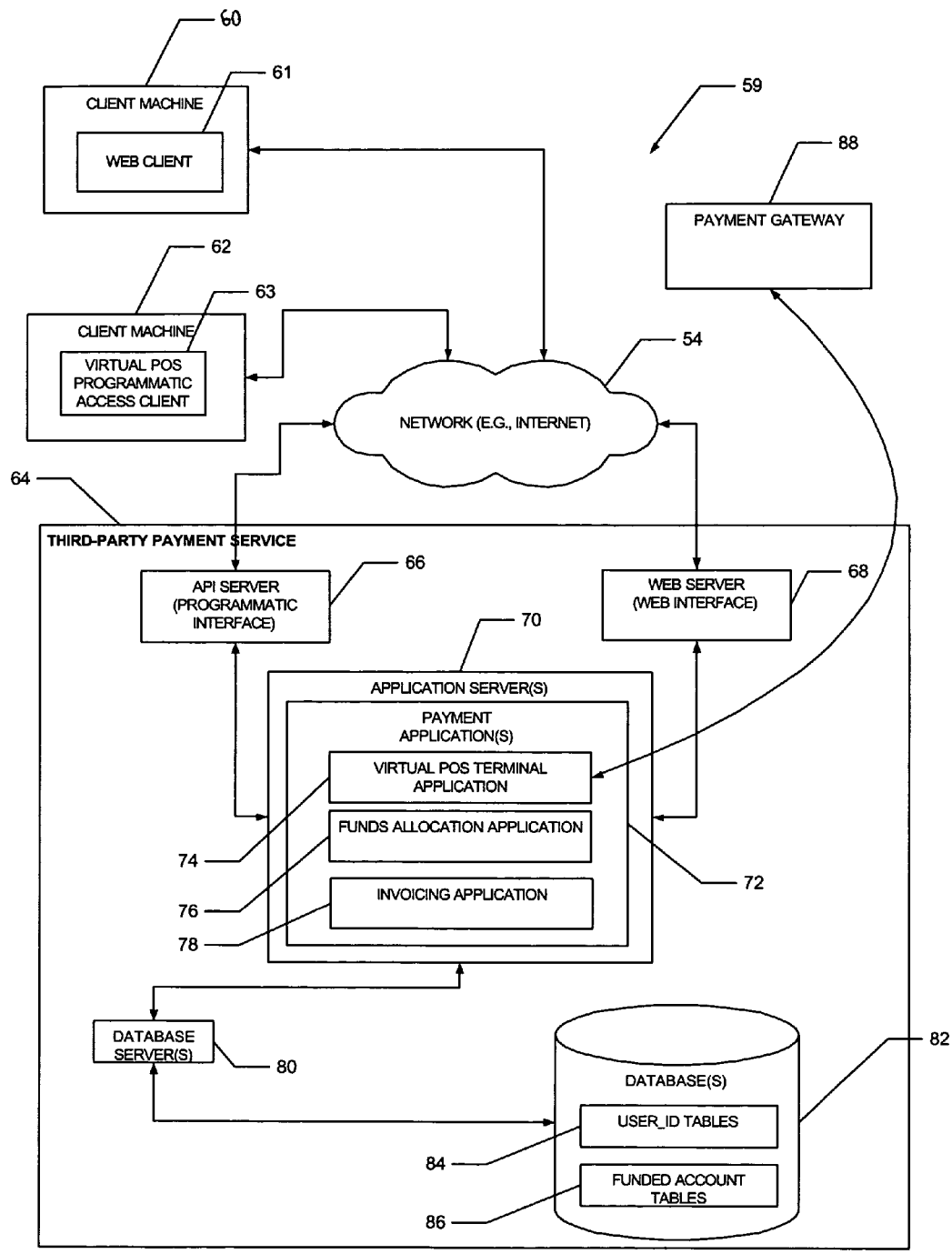
FIG. 4 is a block diagram illustrating an architecture of a system to process a credit card payment transaction, according to an exemplary embodiment of the present invention.

FIG. 4 is a diagrammatic representation of a system 59 to process credit card payment transactions, according to an exemplary embodiment of the present invention. The exemplary embodiment employs a client-server architecture, and a payment service 64, operating in a server role, is accessible via a network 54 (e.g., the Internet) by a number of client machines. Exemplary client machine 60 hosts a web client 61, in the form of a browser application, to enable a user of the client machine 60 access to various applications hosted by, and forming part of, the payment service 64. A further exemplary client machine 62 hosts a virtual POS programmatic access client 63, which facilitates programmatic access to applications of the payment service 64. While the web client 61 may be regarded as a "thin" client, the virtual POS programmatic access client 63 may be regarded as a "fat" client, and provides enhanced functions, and/or performs a greater variety of operations on the client machine 62 than can be performed by the web client 61.

Turning to the payment service 64, an interface to the service 64 is provided, in an exemplary embodiment, by an Application Program Interface (API) server 66, which provides a programmatic interface, and a web server 68 (e.g., the MICROSOFT IIS WEB SERVER), which provides a web interface to the payment service 64. One or more application servers 70 host a number of payment applications 72, including a virtual POS terminal application 74, a funds allocation application 76, and an invoicing application 78. The operations performed by these various applications are described in further detail below. Client applications are able to access the various payment applications 72, via the API server 66 and/or the web server 68, each of which is shown to be coupled to the application server 70.

The application servers 70 are coupled to one or more database servers 80, which facilitate access by the payment applications 72 to one or more databases 82. The databases 82, in the exemplary embodiment, are shown to store a user identification table 84 and a funded accounts table 86, in addition to a large number of other tables.

The virtual POS terminal application 74 is also able to establish a connection, for the purposes of communicating data, with a payment gateway 88, via the network 54.

Figure 5:
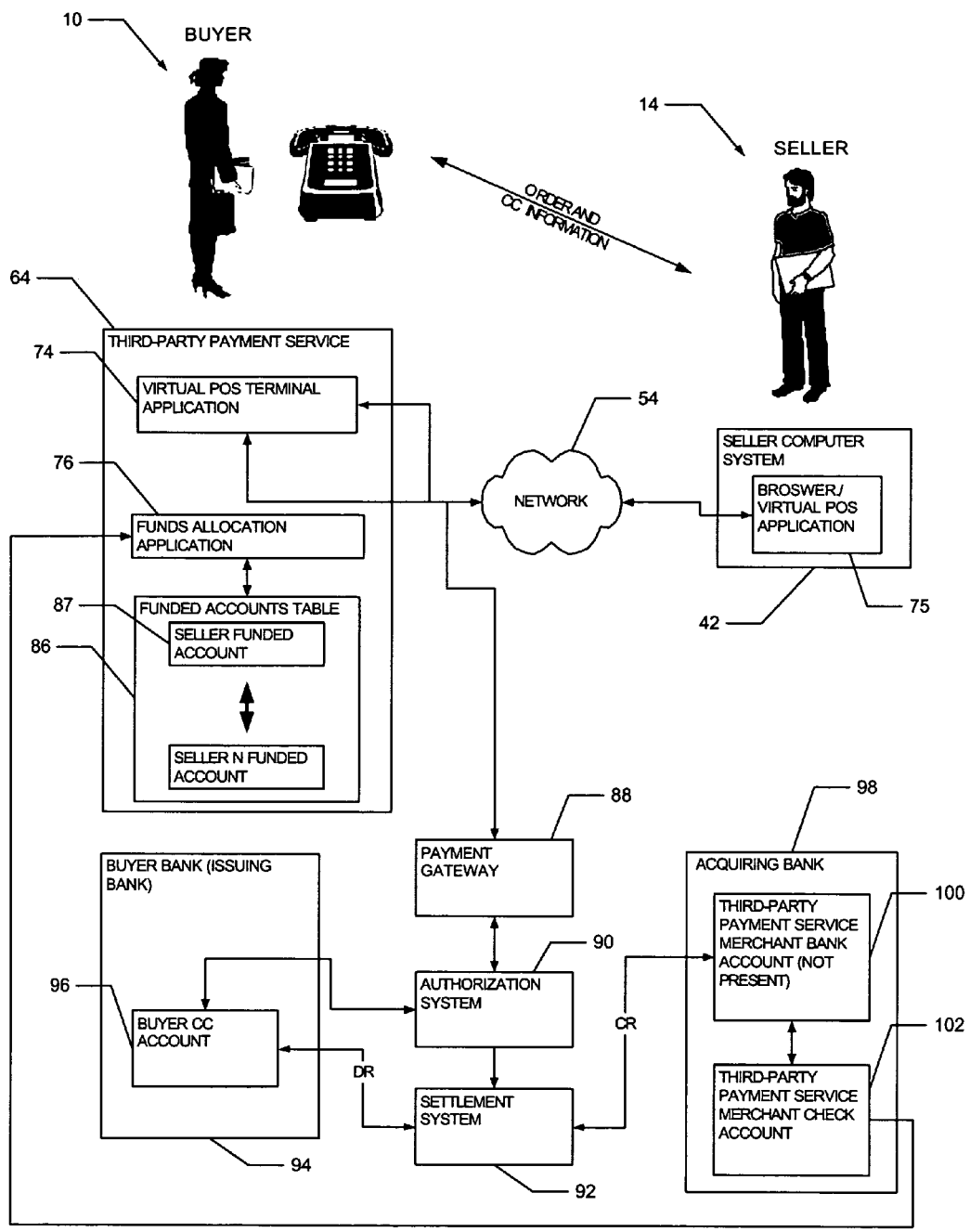
FIG. 5 is a diagrammatic representation of a system to process credit card payment transactions, according to an exemplary embodiment of the present invention, where credit card payment transactions are merchant-initiated, and cause a transfer of funds from a buyer credit card account to a "master" merchant bank account owned by a third-party payment service.

FIG. 5 is a diagrammatic representation illustrating interaction of the system 59, described above with reference to FIG. 4, with elements of a credit card payment transaction processing system. The various operations performed by the components illustrated in FIG. 4 are described below with reference to the flow chart illustrated in FIGS. 6 and 7. Before commencing with the operational description, it should be noted from FIG. 5 that the payment service 64 has established a "master" third-party payment merchant bank account (MA) 100, optionally of the "not present" type, and a third-party payment service check account 102 with an acquiring bank 98. The merchant bank account 100 is associated with the virtual POS terminal application 74, which is hosted on the application servers 70 of the payment service 64.

Also to be noted is that the funded accounts table 86 may contain records for a receiving account, in the exemplary form of a seller funded account 87. The seller funded account 87 is associated with the seller 14, and includes a record of funds, maintained within the third-party payment service check account 102, that belong to the seller 14. The funded accounts table 86 is also shown to maintain records for funded accounts for multiple registered users of the payment service 64.

Figure 6:
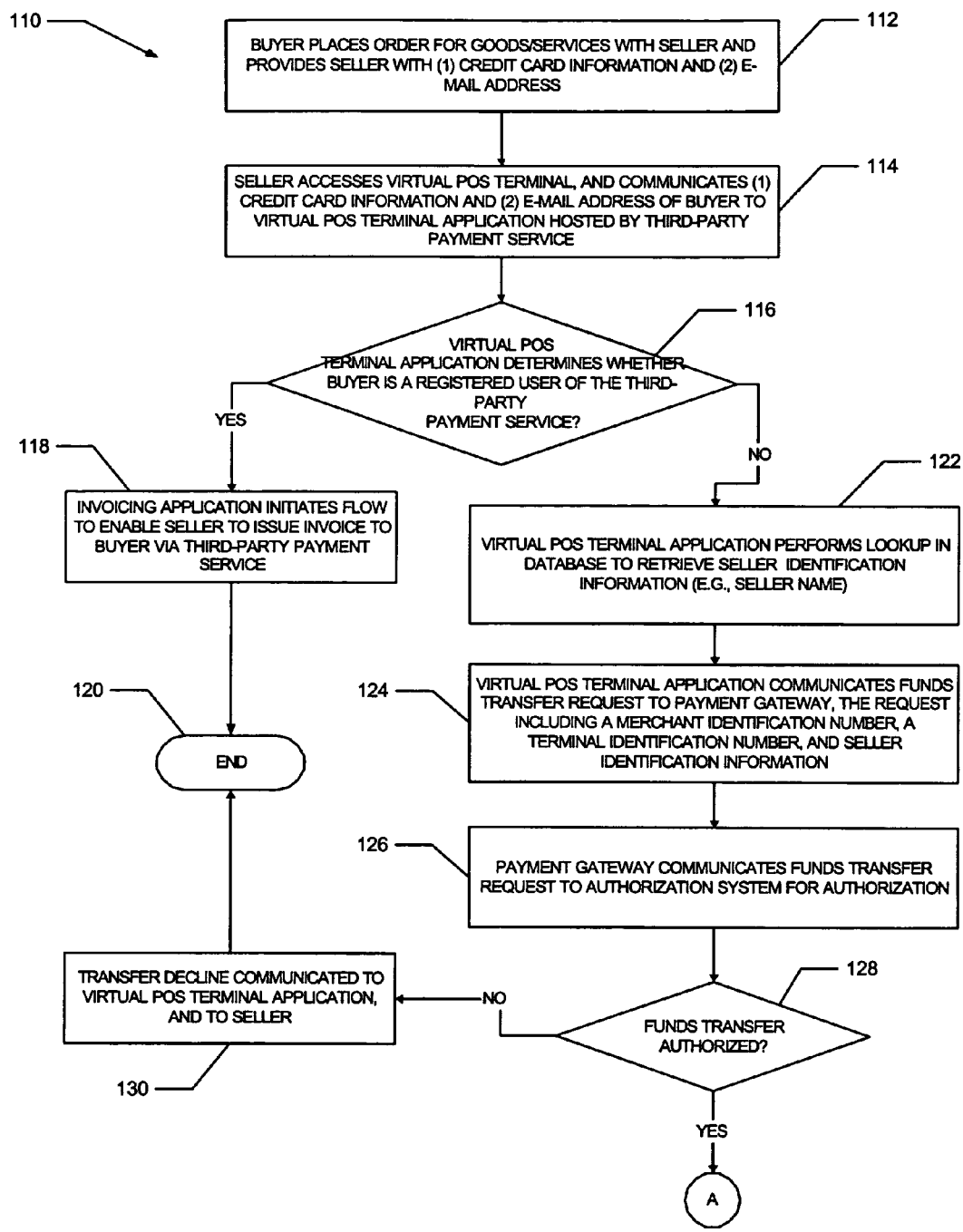
FIGS. 6 and 7 present a flow chart illustrating a method, according to an exemplary embodiment of the present invention, to process credit card payment transactions initiated by a merchant.
Figure 7:
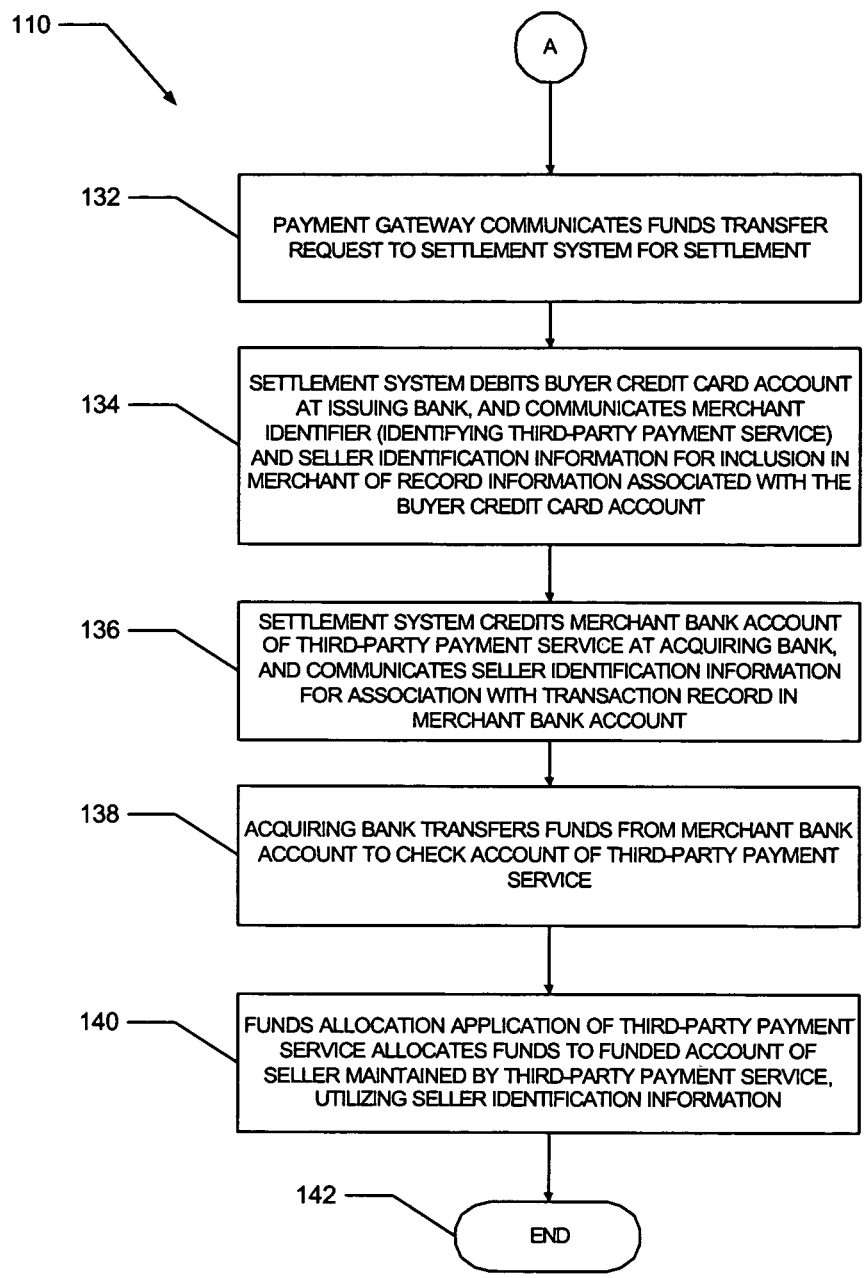

FIGS. 6 and 7 illustrate a flow chart depicting a method 110, according to an exemplary embodiment of the present invention, to process credit card payment transactions, where a merchant initiates the processing of transactions. The method 110 commences at block 112, with the buyer 10 placing an order for goods or services with the seller 14. In order to enable the seller 14 to receive payment for the goods or services, the buyer 10 also provides the seller 14 with personal information including credit card information (e.g., a credit card number, buyer name, issuing authority, expiration date etc.), and buyer identification information (e.g., an email address). The provision of the personal information may, for example, occur telephonically, as illustrated in FIG. 5, or may be achieved using any one of a number of other communication media (e.g., email, web form, fax, mail, etc.). Accordingly, this scenario is what is traditionally regarded as a "not-present" presentation of credit card information.

At block 114, now having the provided personal information in hand, the seller 14 accesses a virtual POS terminal application for the purposes of providing the buyer credit card information and email address to the virtual POS terminal application. In one exemplary embodiment, where the virtual POS terminal application 74 is hosted by the third-party payment service 64, this access may be provided via a browser application 75, hosted on a seller computer system 42. In an alternative embodiment, the virtual POS application may comprise a client application that is hosted on the seller computer system 42. In other embodiments, the virtual POS application may be distributed, with certain components residing on the seller computer system 42, with other components residing on application servers 70 of the third-party payment service 64. In any event, the seller 14 inputs the personal information of the buyer into the virtual POS terminal application at block 114.

Considering an exemplary embodiment in which the virtual POS terminal application 74 is a fully hosted application, FIG. 8 illustrates an exemplary order entry interface 150 that may be generated by the virtual POS terminal application 74, and communicated to the seller computer system 42 via the network 54, for display by the browser application 75. The order entry interface 150 is shown to prompt the seller 14 for customer information 152, including an email address 154, order details 156, and the buyer's credit card information. The order entry interface 150 also includes notification information 160, prompting the seller 14 to make the buyer 10 aware that the merchant of record information, as will eventually appear on the buyer's credit card statement, will identify both the third-party payment service 64 (e.g., ABC Corporation 162), as well as the seller 14 (e.g. "JGOULDTESTO" 164).

At decision block 116 of the method 110, the virtual POS terminal application 74 makes a determination whether the buyer 10 is a registered user of the third-party payment service 64. This determination is made by comparing the personal information, provided by the seller with personal information, regarding registered users, stored within the user identification table 84. For example, the email address 154 of the buyer 10 may be utilized to determine whether the buyer 10 is a registered user.

In the event that the virtual POS terminal application 74 determines that the buyer 10 is in fact a registered user, the invoicing application 78 is invoked to initiate a flow to enable the seller to issue an invoice to the buyer 10, via the third-party payment service 64. In this case, the credit card information received at block 114 is discarded, and the processing of a credit card payment transaction is terminated at block 120. The invoicing application 78 may, for example, be an invoicing application such as that offered by PAYPAL INC., an EBAY COMPANY.

Returning to decision block 116, should it be determined that the buyer 10 is in fact not a registered user of the third-party payment service 64 at block 112, the virtual POS terminal application 74 performs a look-up in the user identification table 84 to retrieve seller identification information (e.g., a seller name) to be included in the transaction of information to be provided to a payment gateway 88.

At block 124, the virtual POS terminal application 74 communicates a funds transfer request, via the network 54, to the payment gateway 88. The finds transfer request includes, inter alia, a merchant identification number, identifying the third-party payment service merchant bank account 100, a terminal identification number, identifying the virtual POS terminal application 74, and the seller identification information retrieved at block 122.

At block 126, the payment gateway 88 communicates the funds transfer request to an authorization system 90, for authorization. The authorization system 90, in turn communicates pertinent information to an issuing bank 94, at which the buyer's credit card account 96 is maintained.

At decision block 128, the authorization system 90 determines whether the funds transfer has been authorized or not. If not, at block 130, a transfer decline is communicated back from the authorization system 90, via the network 54, to the virtual POS terminal application 74, which in turn provides an appropriate communication back to the seller 14. In one exemplary embodiment, this communication may take the form of a transaction failed user interface 166, an exemplary embodiment of which is depicted in FIG. 9. The funds transfer request having been declined, the processing of the credit card payment transaction then again terminates at block 120.

On the other hand, should the funds transfer be authorized at decision block 128, the method 110 progresses to block 132, shown in FIG. 7. At block 132, the payment gateway 88 communicates the funds transfer request to a settlement system 92 for settlement.

At block 132, the authorization system 90 will additionally communicate the transfer approval back to the virtual POS terminal application 74, which may in turn again provide a communication to the seller 14 that the transaction has been approved. In one exemplary embodiment, this communication may take the form of a transaction success user interface, in the exemplary form of a transaction success web page 170, an example of which is provided in FIG. 10.

At block 134, the settlement system 92 proceeds to debit the buyer credit card account 96, maintained at the issuing bank 94. The settlement system 92 further provides a merchant identifier (e.g., the name of the third-party payment service, ABC.COM), identifying the third-party payment service 64, and the seller identification information (e.g., the name of the seller 14, JGOULDTESTO) to the issuing bank 94 for inclusion within merchant of record information to be associated with the buyer credit card account. This information will be reflected on a credit card statement issued by the issuing bank 94 to the buyer 10.

At block 136, the settlement system 92 then credits the merchant bank account 100 of the third-party payment service 64, which is maintained at the acquiring bank 98. The settlement system 92 further communicates the seller identification information for association with an appropriate transaction record in the merchant bank account 100.

At block 138, the acquiring bank 98 transfers the received funds from the merchant bank account 100 to the check account 102 of the third-party payment service 64 maintained at the acquiring bank 98.

At block 140, the funds allocation application 76, of the third-party payment service 64, allocates funds to a receiving account (e.g., the funded account 87) of the seller 14. The seller identification information, provided at block 136, is utilized to determine what funds received via the merchant bank account 100 and the check account 102 are properly allocatable to the funded account 87 of the seller 14. In one exemplary embodiment, the actual funds attributed (or allocated) to the seller 14 may be retained within the check account 102 of the third-party payment service 64, with the funded account 87 maintaining a record of a portion of the balance of the check account 102 that belongs to the seller 14. In another embodiment, the third-party payment service 64 may in fact be a registered bank, and the allocation of funds performed at block 140 may involve an actual transfer of value from the check account 102 into a bank account (e.g., a check account) maintained by the third-party payment service 64.

Accordingly, it will be appreciated that a "master" third-party merchant bank account 100 is enabled, via the third-party payment service 64, to receive merchant-initiated credit card payments on behalf of multiple sellers 14, and then to distribute payments so received to receiving accounts that are maintained by, or are accessible via, the third-party payment service 64. This may be advantageous in that it allows multiple sellers 14 to leverage a merchant bank account 100 that has been established, and is owned, by the third-party payment service 64. Accordingly, sellers 14 are spared the inconvenience and costs associated with establishing individual merchants accounts with one or more acquiring banks. Further, as the merchant bank account 100 may receive payments on behalf of a large volume of sellers 14, the size of the merchant bank account 100 may allow the third-party payment service 64 to obtain certain cost efficiencies, which can optionally be passed on to the sellers 14. Additionally, the establishment of the third-party merchant bank account 100 enables the third-party payment service 64 to optionally provide the convenience of a virtual POS terminal application 74 to any number of sellers 14, again without the inconvenience to the sellers 14 of having to establish individual merchant bank accounts.

Figure 11:
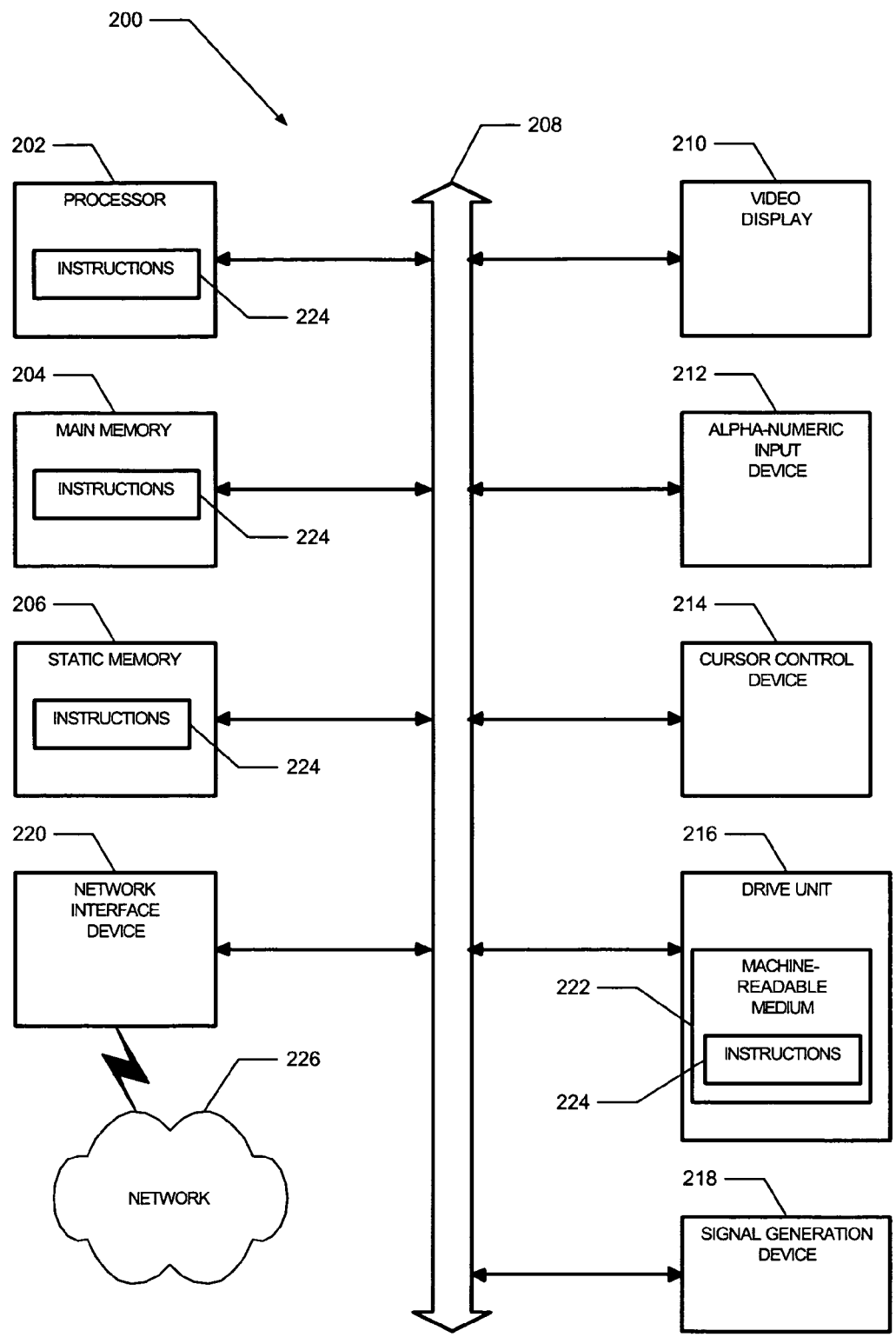
FIG. 11 is a diagrammatic representation of a machine, in the exemplary form of a computer system, within which a set of instructions, for causing the machine to perform any one of the methodologies discussed herein, may be executed.

FIG. 11 shows a diagrammatic representation of machine in the exemplary form of a computer system 200 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions (e.g., software 224) embodying any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220.

While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, a method and a system to process credit card payment transactions, initiated by a merchant, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to process credit card payment transactions initiated by a merchant, the system including:
a hardware interface to receive a merchant-initiated request for a transfer of funds from a buyer credit card account associated with a buyer;
a credit card processing application to initiate the transfer of funds from the buyer credit card account to a master third-party merchant bank account, held by a third-party payment service to receive merchant-initiated credit card payments on behalf of multiple merchants, the master third-party merchant bank account to receive funds from the buyer credit card account on behalf of the merchant issuing the request; and
a funds allocation application to allocate the received funds to a receiving account of the merchant issuing the request, the receiving account being maintained by the third-party payment service
wherein the credit card processing application is to determine whether the buyer is a registered user of the third party payment service and, based on a determination that the buyer is a registered user, to prompt the merchant to issue an invoice, via the third party payment service, to the buyer instead of initiating the transfer of funds.

2. The system of claim 1, wherein the credit card processing application is a virtual point of sale (POS) terminal application to provide a web form for transferring credit card information over the Internet.

3. The system of claim 2, wherein the virtual POS terminal application is hosted at a server computer system operated by the third-party payment service, and is accessible by the merchant via a network.

4. The system of claim 1, wherein the interface to receive the merchant-initiated request for a transfer of funds from the buyer credit card account is a Web-based application.

5. The system of claim 1, wherein the credit card processing application is to communicate a merchant bank account identifier, identifying the third-party merchant bank account, to a payment gateway.

6. The system of claim 5, wherein the credit card processing application is to communicate a merchant identifier, identifying the merchant, to the payment gateway to record merchant of record information against the buyer credit card account to identify both the third-party payment service and the merchant.

7. The system of claim 1, wherein the funds allocation application is to update an account record, maintained by the third-party payment service, to indicate the allocation.

8. The system of claim 1, wherein the credit card processing application is to determine, from buyer identification information included in the merchant-initiated request, whether the buyer is a registered user of the third party payment service and, based on the determination, to prompt the merchant to issue an invoice, via the third party payment service, to the buyer instead of initiating the transfer of funds.

9. The system of claim 8, wherein the buyer identification information is an e-mail address associated with the buyer.

10. A computer-implemented method to process credit card payment transactions initiated by a merchant, the method including:
receiving a merchant-initiated request for a transfer of funds from a buyer credit card account associated with a buyer, wherein the merchant-initiated request for the transfer of funds is received from a Web-based application;
initiating, by at least one computer processor and computer storage, the transfer of funds from the buyer credit card account to a master third-party merchant bank account, held by a third-party payment service to receive merchant-initiated credit card payments on behalf of multiple merchants, the master third-party merchant bank account to receive funds from the buyer credit card account on behalf of the merchant issuing the request; and
allocating the received funds to a receiving account of the merchant issuing the request, the receiving account being maintained by the third-party payment service
wherein the credit card processing application is to determine whether the buyer is a registered user of the third party payment service and, based on a determination that the buyer is a registered user, to prompt the merchant to issue an invoice, via the third party payment service, to the buyer instead of initiating the transfer of funds.

11. The computer-implemented method of claim 10, wherein the merchant-initiated request for the transfer of funds is received from the merchant at a virtual point of sale (POS) terminal application, the virtual POS terminal application providing a web form for transferring credit card information over the Internet.

12. The computer-implemented method of claim 11, wherein the virtual POS terminal application is hosted at a server computer system operated by the third-party payment service, and is accessible by the merchant via a network.

13. The computer-implemented method of claim 12, wherein the virtual POS terminal application to receive the merchant-initiated request for a transfer of funds from the buyer credit card account is a Web-based application.

14. The computer-implemented method of claim 11, wherein the virtual point of sale (POS) terminal is to receive the credit card information provided by the merchant via the web form.

15. The computer-implemented method of claim 11, wherein the virtual POS terminal application is accessible via a web browser.

16. The computer-implemented method of claim 15, wherein the web browser is served by a web server hosted on a merchant computer system.

17. The computer-implemented method of claim 16, wherein the web browser uses web services distributed between a merchant computer system and a third party computer system.

18. The computer-implemented method of claim 10, wherein the initiation of the transfer of funds includes communicating a merchant bank account identifier, identifying the third-party merchant bank account, to a payment gateway.

19. The computer-implemented method of claim 18, wherein the initiation of the transfer of funds includes communicating a merchant identifier, identifying the merchant, to the payment gateway, to record merchant of record information in the buyer credit card account to identify both the third-party payment service and the merchant.

20. The computer-implemented method of claim 10, wherein the allocation of the received funds to the receiving account of the merchant includes updating an account record, maintained by the third-party payment service, to indicate the allocation.

21. The computer-implemented method of claim 10, including determining, from buyer identification information included in the merchant-initiated request, whether the buyer is a registered user of the third party payment service and, based on the determination, prompting the merchant to issue an invoice, via the third party service, to the buyer instead of initiating the transfer of funds.

22. The computer-implemented method of claim 21, wherein the buyer identification information is an e-mail address associated with the buyer.

23. The computer-implemented method of claim 10, wherein the allocating of the received funds to a receiving account of the merchant comprises transferring the funds from the third party merchant bank account to a checking account of the third-party payment service.

24. A computer-readable hardware storage device storing a set of instructions that, when executed by one or more processors, cause the one or more processors to perform the following operations, comprising:
   receive a merchant-initiated request for a transfer of funds from a buyer credit card account associated with a buyer, wherein the merchant-initiated request for the transfer of funds is received from a web based application;
   initiate the transfer of funds from the buyer credit card account to a master third-party merchant bank account, held by a third-party payment service to receive merchant-initiated credit card payments on behalf of multiple merchants, the master third-party merchant bank account to receive funds from the buyer credit card account on behalf of the merchant initiating the request; and
   allocate the received funds to a receiving account of the merchant issuing the request, the receiving account being maintained by the third-party payment service
      wherein the credit card processing application is to determine whether the buyer is a registered user of the third party payment service and, based on a determination that the buyer is a registered user, to prompt the merchant to issue an invoice, via the third party payment service, to the buyer instead of initiating the transfer of funds.

* * * * *

UNITED STATES PATENT AND TRADEMARK OFFICE
CERTIFICATE OF CORRECTION

| | |
|---|---|
| PATENT NO. | : 8,682,784 B2 |
| APPLICATION NO. | : 10/941510 |
| DATED | : March 25, 2014 |
| INVENTOR(S) | : Schleicher |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1074 days.

Signed and Sealed this
Twenty-third Day of June, 2015

Michelle K. Lee
*Director of the United States Patent and Trademark Office*

UNITED STATES PATENT AND TRADEMARK OFFICE
CERTIFICATE OF CORRECTION

PATENT NO.         : 8,682,784 B2
APPLICATION NO.    : 10/941510
DATED              : March 25, 2014
INVENTOR(S)        : Schleicher It is certified that error appears in the above-identified patent and that said Letters Patent is hereby corrected as shown below:

Specification

In Column 1, Line 67, delete "seller's-" and insert -- seller's --, therefor.

In Column 7, Line 14, delete "finds" and insert -- funds --, therefor.

Signed and Sealed this
Sixth Day of October, 2015

Michelle K. Lee
*Director of the United States Patent and Trademark Office*